United States Patent

Itoh et al.

[11] Patent Number: 5,847,696
[45] Date of Patent: Dec. 8, 1998

[54] X-Y COORDINATE INPUT DEVICE

[75] Inventors: Akihisa Itoh; Nobuhiro Oura, both of Fukushima-ken, Japan

[73] Assignee: Alps Electric Co., Ltd., Tokyo, Japan

[21] Appl. No.: 684,271

[22] Filed: Jul. 17, 1996

[30] Foreign Application Priority Data

Aug. 7, 1995 [JP] Japan ................................. 7-201155

[51] Int. Cl.$^6$ .................................................. G09G 5/08
[52] U.S. Cl. ........................................ 345/163; 345/156
[58] Field of Search .................................... 345/163, 164, 345/165, 166, 167, 168, 169, 156, 157, 158, 145, 146; 74/471 XY

[56] References Cited

U.S. PATENT DOCUMENTS

| 4,831,736 | 5/1989 | Bryant, Sr. ........................... 345/163 |
| 5,063,289 | 11/1991 | Jasinski et al. ...................... 345/163 |
| 5,260,696 | 11/1993 | Maynard, Jr. ......................... 345/163 |

Primary Examiner—Xiao Wu
Attorney, Agent, or Firm—Brinks Hofer Gilson & Lione

[57] ABSTRACT

An X-Y coordinate input device is made up of a mouse main body, a stop-position regulating member attached to the mouse main body, return springs for constantly biasing the stop-position regulating member in an upward direction, a disengaging button for downwardly pressing the stop-position regulating member, and a movable shell. First and second guide grooves are formed in the mouse main body, and first and second guide protuberances which are engageable with the first and second guide grooves are formed on the movable shell. First, second, and third stop-position regulating faces are formed on the upper surface of the stop-position regulating member. A stop-position regulating protuberance which is engageable with the first, second, and third stop-position regulating faces is formed on the movable shell. The movable shell is longitudinally moved with respect to the mouse main body by changing the position where the guide protuberances engage with the guide grooves as well as changing the stop-position regulating faces with which the stop-position regulating protuberance engages.

16 Claims, 11 Drawing Sheets

X-Y COORDINATE INPUT DEVICE

BACKGROUND OF THE INVENTION

1. Field of the Invention

The present invention relates to an X-Y coordinate input device generally called "mouse" and, more particularly, to a structure for mounting a movable shell on a mouse main body of the X-Y coordinate input device which comprises the movable shell attached to the top of the mouse main body and enables the movable shell to be changed with respect to the mouse main body so as to suit the preferences of the user.

2. Description of the Related Art

A conventional mouse X-Y coordinate input device comprises a ball, first and second rotary members which are disposed in the directions orthogonal to the rotating center O of the ball to be rotated and are rotated by, while remaining in contact with, the ball, first and second rotation angle detectors, e.g., encoders, for detecting a rotation angle of each rotary member, a printed board on which required electronic components are mounted, switches for sending signals to a graphics display unit and a personal computer to which the mouse is connected, and a case-shaped mouse main body. These elements are housed in the mouse main body, and actuating sections such as the switches are disposed at the front end of the mouse main body.

FIG. 20 is a perspective view showing a conventionally known X-Y coordinate input device of the above described type which is in use. Two switch actuating sections 2a and 2b are disposed at the front end of a mouse main body 1. The mouse is operated on top of a desk 3. As shown in FIG. 20, the mouse main body 1 is gripped by the thumb, the third finger, and the little finger with the palm of the hand laid on top of the mouse main body 1. The thus held mouse main body 1 is moved along the upper surface of the desk 3, whereby the mouse is operated. The switch actuating sections 2a and 2b are selectively actuated by the operator's forefinger or middle finger, as required. As a result, signals are sent to the display unit and the personal computer to which the X-Y coordinate input device is connected.

In the case of the above described conventional X-Y coordinate input device, the case constituting the mouse main body 1 is limited to a predetermined shape and size. It is impossible to change the configuration of the mouse main body 1 according to the size and thickness of the palm of the hand, lengths of the fingers, and variations in a operation posture. For this reason, the shape and size of the mouse main body 1 may fail to fit the operator's hand depending on the user's physical conditions and operation posture, which may in turn result in an undesirable feeling of use. In this way, if the shape and size of the mouse main body 1 do not fit the operator's hand, it becomes impossible to suitably position the fingertips at the switch actuating sections 2a and 2b. The wrist may be twisted at an increased angle when trying to grip the mouse main body 1, or the feeling of operation of the switches may become changed. As a result, the switches may not be smoothly operated, or the operator will become more likely to experience hand, neck, or shoulder fatigue.

SUMMARY OF THE INVENTION

The present invention is conceived to solve the foregoing drawbacks in the art, and the primary object of the present invention is to provide an X-Y coordinate input device which provides superior feeling of operation and use of switch actuating sections and prevents a user from experiencing fatigue even when the user uses the device for a long period of time.

To this end, according to one aspect of the present invention, there is provided an X-Y coordinate input device including a mouse main body and a movable shell which is attached on top of the mouse main body so as to be changeable to another position with respect to the mouse main body, the improvement being characterized by the facts that the movable shell is attached to the mouse main body so as to be movable in a longitudinal direction thereof, and an interval between a switch actuating section disposed in the mouse main body and the area of the movable shell with which an operator's palm comes into contact is made changeable.

In one embodiment of the X-Y coordinate input device, the movable shell is preferably attached to the mouse main body so as to be movable in both longitudinal and vertical directions thereof. The movable shell preferably moves upwards with respect to a lower surface of the mouse main body as it moves a forward position of the mouse main body in its rearward direction.

More preferably, a rear portion of the movable shell vertically moves to a higher position than that to which a front portion of the same vertically moves.

In another embodiment of the X-Y coordinate input device, guide grooves are preferably made in either the mouse main body or the movable shell. Protuberances which are engageable with the guide grooves are preferably formed in the other member. As a result of the movement of the protuberances along the guide grooves, the movable shell preferably moves in a desired direction with respect to the mouse main body.

In still another embodiment of the X-Y coordinate input device, the movable shell preferably moves in stages in the longitudinal direction of the mouse main body.

More preferably, an element for regulating a stop position (hereinafter simply referred to as a stop-position regulating element) is preferably provided with a plurality of faces for regulating a stop position (hereinafter simply referred to as stop-position regulating faces) which are parallel to each other and spaced at given intervals away from each other in the longitudinal direction of the mouse main body. The stop-position regulating element is preferably disposed on the mouse main body. Projections for regulating a stop position (hereinafter simply referred to as stop-position regulating projections) preferably project from the interior surface of the movable shell so as to be engageable with the respective stop-position regulating faces. As a result of selective engagement between the stop-position regulating projection and any one of the stop-position regulating faces, the position of the movable shell can be preferably set in stages with respect to the mouse main body.

More preferably, the stop-position regulating element is preferably attached to the top of the mouse main body so as to be vertically movable via return springs, and the movable shell is preferably provided with a disengaging button which can be operated from the outside of the movable shell and is constantly in contact with the stop-position regulating element. As a result of pressing the disengaging button, the stop-position regulating element is preferably lowered against an elastic spring force of the return springs, so that the stop-position regulating faces are disengaged from the stop-position regulating projections. As a result, the preset position of the movable shell can be preferably changed with respect to the mouse main body.

In yet another embodiment of the X-Y coordinate input device, the mouse main body is preferably provided with an element for preventing the movable shell from becoming dislodged from the mouse main body (hereinafter simply referred to as a prevention element).

In a further embodiment of the X-Y coordinate input device, the prevention element is preferably only attached to, or removed from, the inside of the mouse main body.

By means of the above described configurations, when the movable shell is attached to the mouse main body so as to be movable in the longitudinal direction of the mouse main body, the interval between the switch actuating section disposed in the mouse main body and the area of the movable shell with which the palm of the hand comes into contact can be changed in response to the extent of the longitudinal movement of the movable shell. Accordingly, it becomes possible to make the X-Y coordinate input device suit the preferences of the user which may be different depending on the size and thickness of the hand and the lengths of the fingers. Further, differing from an X-Y coordinate input device in which the front end of a movable shell is pivoted in relation to a mouse main body, the X-Y coordinate input device of the present invention does not require the operator to twist the wrist at an a different angle when gripping the movable shell even if the position of the movable shell is changed. This makes it possible to ensure stable operability of the switch actuating sections as well as the constant feeling of the use of the X-Y coordinate input device. As a result, it is possible to provide an X-Y coordinate input device which provides superior operability and feeling of use of switch actuating sections and prevents a user from experiencing fatigue even when the user uses the device for a long period of time.

DESCRIPTION OF THE PREFERRED EMBODIMENTS

Figure 1:
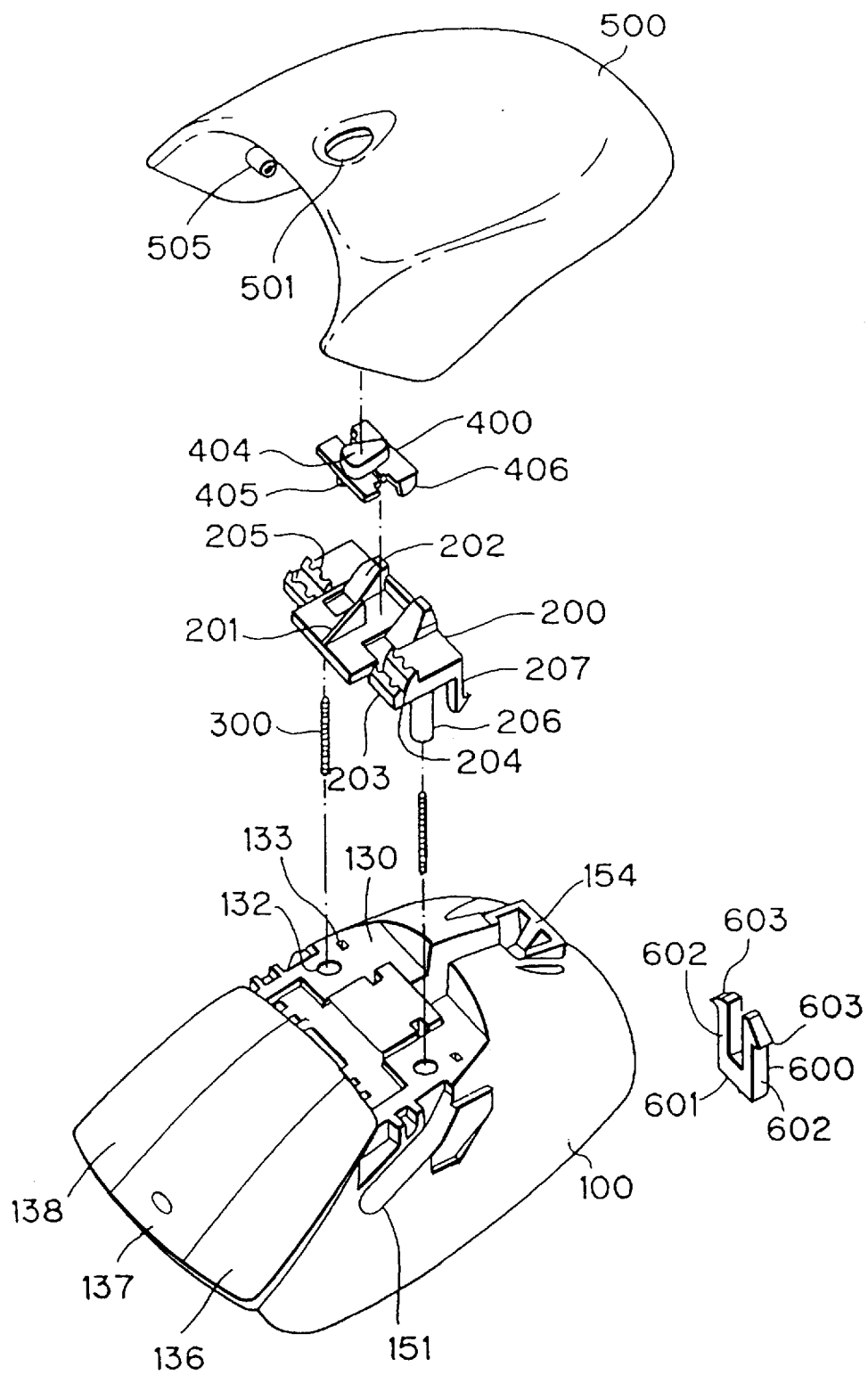
FIG. 1 is an exploded perspective view of an X-Y coordinate input device according to one embodiment of the present invention.

FIG. 1 is an exploded perspective view of an X-Y coordinate input device according to one embodiment of the present invention. As is evident from the drawing, the X-Y coordinate input device of the present embodiment comprises a mouse main body 100, an element 200 for regulating a stop position (hereinafter simply referred to as a stop-position regulating element) which is attached to the mouse main body 100, return springs 300 for constantly biasing the stop-position regulating element 200 in an upward direction, a disengaging button 400 for pressing the stop-position regulating element 200, a movable shell 500, and an element 600 for preventing the movable shell 500 from becoming dislodged from the mouse main body 100 (hereinafter simply referred to as a prevention element). The X-Y coordinate input device according to the present embodiment will be hereinbelow described for each of the constituent components of the X-Y coordinate input device.

<Configuration of Mouse Main Body 100>

Figure 2:
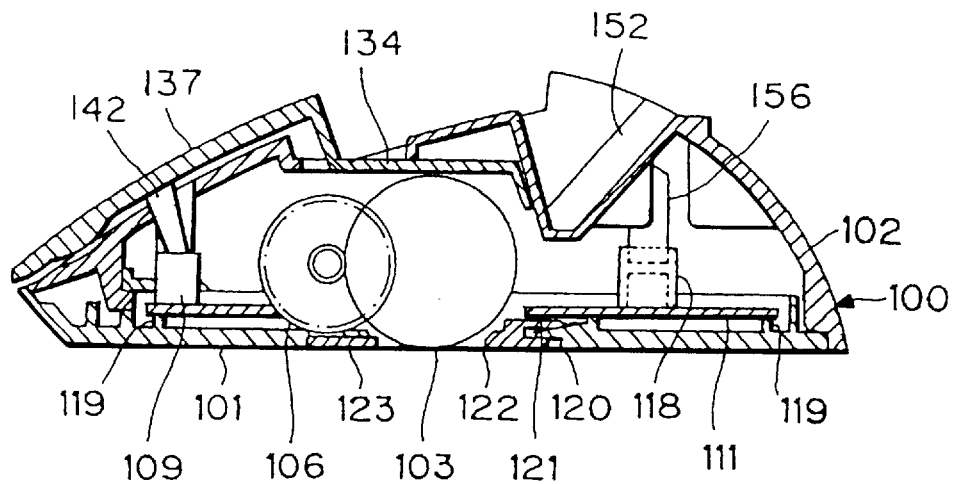
FIG. 2 is a cross-sectional view of a mouse main body of the X-Y coordinate input device.
Figure 3:
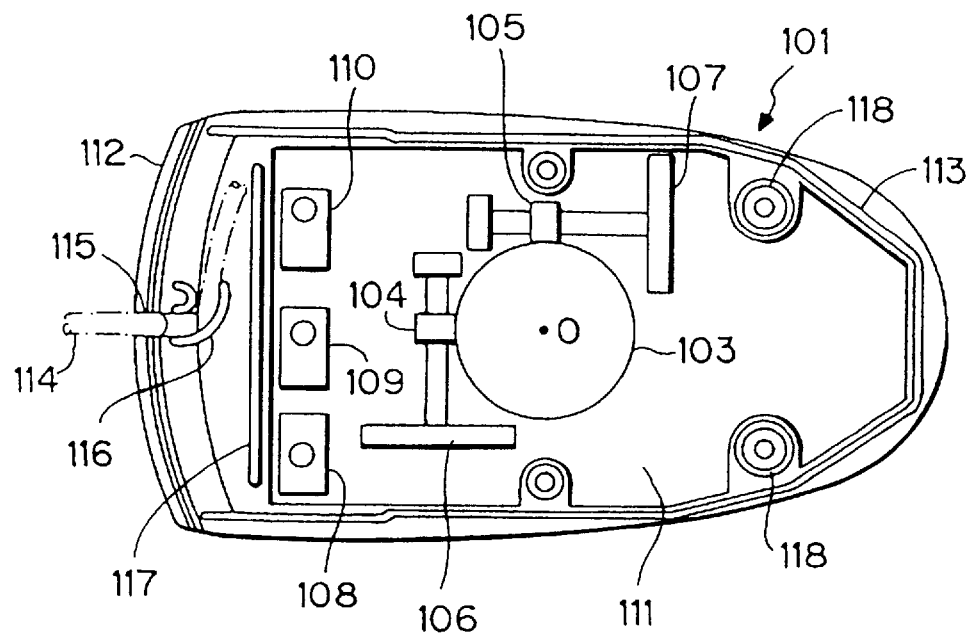
FIG. 3 is a plan view of the mouse main body when an upper case is removed from the mouse main body.
Figure 4:
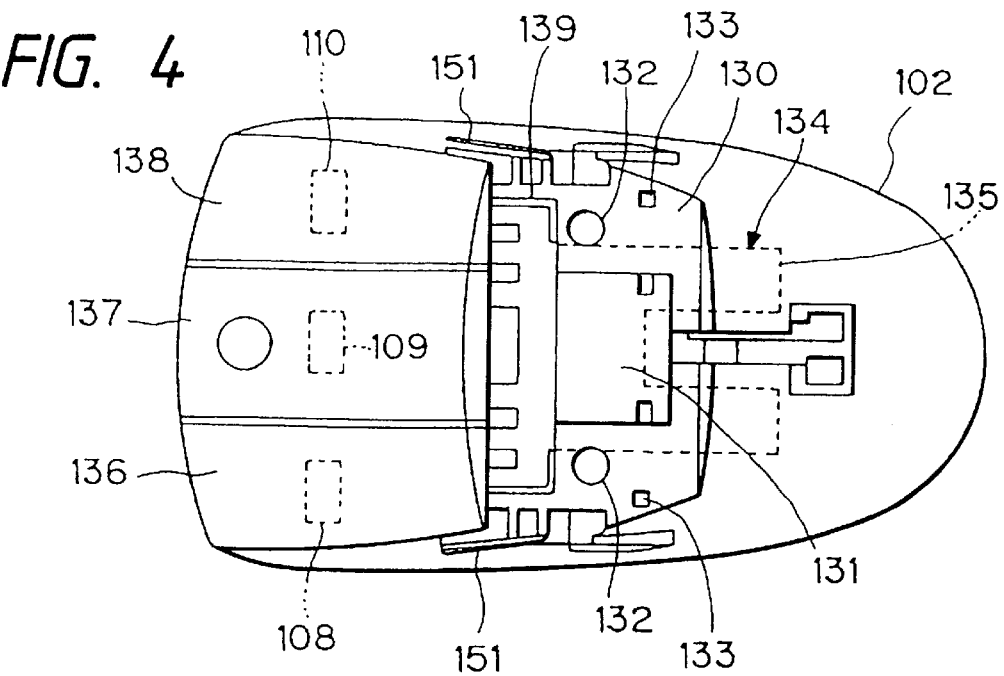
FIG. 4 is a plan view of the upper case.
Figure 5:
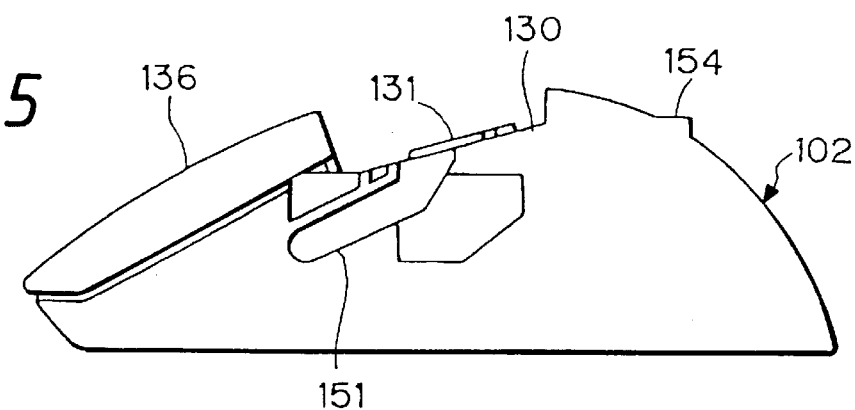
FIG. 5 is a side view of the upper case.
Figure 6:
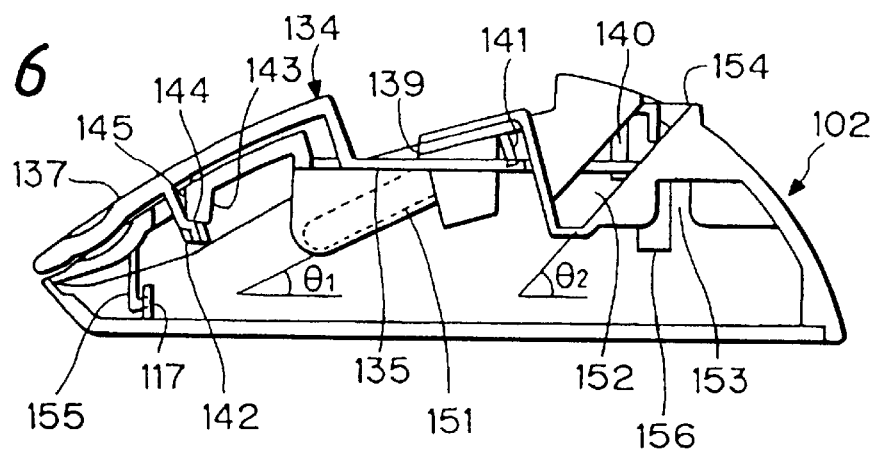
FIG. 6 is a cross-sectional view of the upper case.

With reference to FIGS. 2 through 6, the mouse main body 100 of the present embodiment will be described. FIG. 2 is a cross-sectional view of the mouse main body 100, FIG. 3 is a plan view of the mouse main body 100 from which an upper case is removed, FIG. 4 is a side view of the upper case, FIG. 5 is a side view of the upper case, and FIG. 6 is a cross-sectional view of the upper case.

As shown in FIGS. 2 and 3, the mouse main body 100 is made up of a lower case 101 and an upper case 102 and is assembled into a sealed container which has a shape and size easy to grip with the fingers and hand. The mouse main body 100 houses therein a ball 103, first and second rotary members 104 and 105 which are rotated by, while remaining in contact with, the ball 103, rotational angle detectors 106 and 107 for detecting rotational angles of the rotary members 104 and 105, switches 108, 109 and 110 like tact switches, and a printed board 111 on which these electrical components are mounted. The rotary members 104 and 105 are respectively disposed in the directions orthogonal to the center O of the ball 103.

The lower case 101 is formed substantially into the shape of ellipse, as shown in FIG. 3. A front plate 112 upwardly and forwardly projects at an angle so as to extend along the circular-arc front edge. A circumferential wall 113 vertically projects so as to extend along the periphery of the lower case 101 other than the front plate 112 to such a certain height as to fit the internal peripheral surface of the lower edge of the upper case 102. A cord insert groove 115 is recessed in the center of the front plate 112 so that an electrical cord 114 for electrically connecting the mouse main body 100 to a graphics display unit and the like, may be guided into the mouse main body 100. A cord retaining protuberance 116 projects from the interior surface of the lower case 101 behind the cord insert groove 115 in order to retain the electrical cord 114 in an angularly bent manner. An engaging plate 117, which engages with a corresponding element provided on the lower surface of the upper case 102, upward projects behind the cord retaining protuberance 116 so as to support the upper case 102. Bosses 118 into which the upper case 102 is screwed upward project along the interior surface of the rear end portion of the circumferential wall 113. Projecting mounts 119 for supporting the printed board 111 upward project from the interior surface of the lower case 101; namely, one behind the engaging plate 117 and the other close to the interior surface of the rear end portion of the circumferential wall 113. An opening 120 is formed substantially in the center of the lower case 101, and an opening 121 is formed substantially in the center of the printed board 111 so that the ball 103 can be housed in the mouse main body 100 from under the lower case 101. A ball cap 123 in which an opening 122 is formed so as to permit the ball 103 to partially bulge to the outside is removably fitted into the opening 120.

In addition to the previously described components, the mouse main body 100 houses therein components for regulating up-and-down movements and fluctuations of the ball 103, components for fixing the printed board 111, and a variety of electronic components such as CPUs. However, these elements pertain to the publicly known matters and do not characterize the present invention, and hence their explanations will be omitted.

As shown in FIGS. 4 to 6, the upper case 102 has a planar configuration similar to that of the lower case 101 and is formed into the form of a cup turned upside down. A mount 130 is recessed substantially in the center of the upper surface, and the stop-position regulating member 200 which will be described later will be mounted on the mount 130. The mount 130 comprises a stop surface 131 for stopping the stop-position regulating member 200, and two holes 132 to which the stop-position regulating member is attached are symmetrically formed on both sides of the stop surface 131. Further, two holes 133 to which the stop-position regulating member are attached are formed at rearward positions of the mount 130 with respect to the holes 132.

An actuating element 134 for the switches 108, 109 and 110 disposed in the mouse main body 100 is attached below the lower surface of the mount 130. The actuating element 134 comprises a planar fixing portion 135, and switch actuating portions 136, 137 and 138 which are made by longitudinally separating the forward region of the fixing portion 135 into three, as shown in FIGS. 4 and 6. The fixing portion 135 is inserted into the upper case 102 through an actuating element insert opening 139 formed in the front of the mount 130. The thus inserted fixing portion 135 is fixed by attachment pins 140 and stop claws 141, whereby it is attached below the lower surface of the mount 130. The switch actuating sections 136, 137 and 138 are disposed so as to correspond to the switches 108, 109 and 110 disposed in the mouse main body 100, as shown in FIG. 4.

A switch pressing element 142 downward projects from the lower surface of each of the switch actuating sections 136, 137 and 138, as shown in FIG. 6. A step 144 is formed in the switch pressing element 142 so as to engage with an engaging protuberance 143 projecting from the lower surface of the upper case 102. Through holes 145 are formed in the upper case 102 so as to permit the switch pressing elements 142 to pass. The engaging protuberance 143 projects from part of the periphery of each through hole 145. The switch actuating sections 136, 137 and 138 are attached to the front region of the upper case 102 by inserting the switch pressing elements 142, which project from the lower surface of the switch actuating sections, into the through holes 145 opened in the upper case 102 so as to engage the steps 144 with the engaging protuberances 143. The switch actuating sections 136, 137 and 138 are vertically movable between where the step 144 of each switch actuating section engages with the corresponding engaging protuberance 143 and where the lower surface of each of the switch actuating sections 136, 137 and 138 comes into contact with the upper surface of the upper case 102. As a result of the step 144 engaging with the engaging protuberance 143, the extent in which the switch actuating sections 136, 137 and 138 are movable can be made constant. Accordingly, an excellent feeling of operation of the switches 108, 109 and 110 is attained.

As shown in FIG. 5, a first guide groove 151 for guiding the movable shell 500 whose details will be described later is recessed in each side of the upper case 102 so as to forwardly extend substantially from the center over a certain distance. A second guide groove 152 for guiding the movable shell 500 in cooperation with the first guide grooves 151 is formed at a rearward position of the upper case 102 with respect to the stop surface 131. An inclination angle $\theta_2$ of the second guide groove 152 is set greater than an inclination angle $\theta_1$ of the first guide groove 151. The upper end of the second guide groove 152 extends to the upper surface of the upper case 102. An insert groove 153, into which the prevention element 600 is inserted, is formed so as to partially cross the upper end of the second guide groove 152. The insert groove 153 is formed such that its upper end reaches the upper surface of the upper case 102, and a stop surface 154 for use with the prevention element 600 is formed along the periphery of the upper end of the insert groove 154.

An engaging claw 155 which meshes with the engaging plate 117 upward projecting from the front portion of the lower case 101 downward projects from the interior surface of the front portion of the upper case 102, and bosses 156 which abut against the bosses upward projecting from the rear portion of the lower case 101 downward project from the interior surface of the rear of the upper case 102, as shown in FIG. 6.

The mouse main body 100 of the present embodiment will be assembled in the following manner. To begin with, the ball 103, the first and second rotary members 104 and 105, the first and second rotational angle detectors 106 and 107, and the printed board 111 on which the switches 108, 109 and 110 are provided, are mounted on the lower case 101. Next, as illustrated in FIG. 2, the upper case 102 is placed on top of the lower case 101 such that the interior surface of the upper case 102 comes into contact with the exterior surface of the circumferential wall 113. The engaging claw 155 downward projecting from the interior surface of the upper case 102 engages with the engaging plate 117 upward projecting from the upper surface of the lower case 101. As a result, the bosses 118 upward projecting from the upper surface of the lower case 101 automatically abut against the corresponding bosses 156 projecting from the interior surface of the upper case 102 in a predetermined positional relationship. Screws (not shown) are inserted into the bosses 118 through the lower surface of the lower case 101, whereby the bosses 156 are fastened. Consequently, the mouse main body 100 is assembled into one unit.

<Configuration of Stop-position Regulating Member 200>

Figure 7:
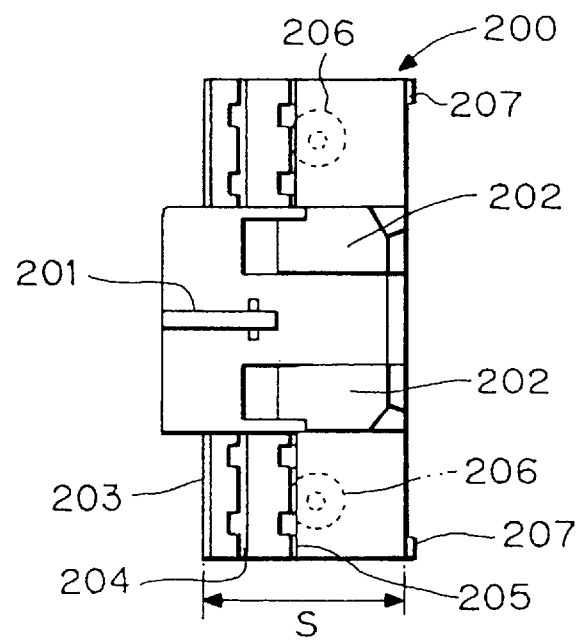
FIG. 7 is a plan view of a stop-position regulating element.

The configuration of the stop-position regulating member 200 will now be described with reference to FIGS. 7 to 9. FIG. 7 is a plan view of the stop-position regulating member 200, FIG. 8 is a side view of the stop-position regulating member 200, and FIG. 9 is a cross-sectional view showing the principal elements of the stop-position regulating member 200 when being attached to the upper case 102.

Figure 8:
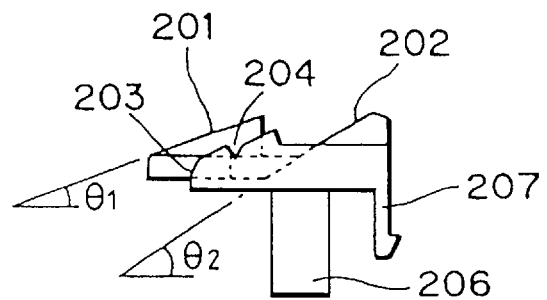
FIG. 8 is a side view of the stop-position regulating element.
Figure 9:
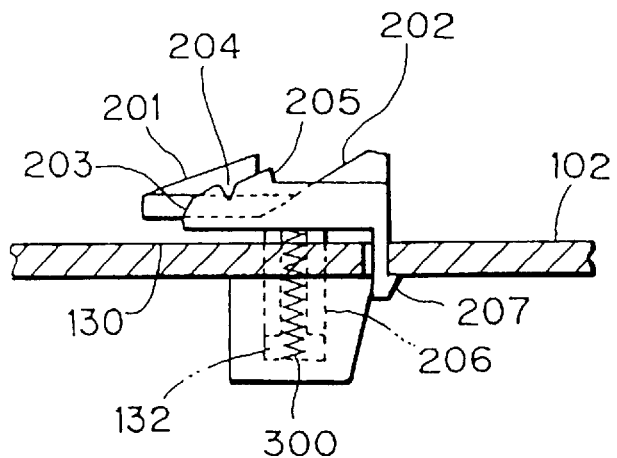
FIG. 9 is a side cross-sectional view of the principal portions of the stop-position regulating element when it is attached to the upper case.

As shown in FIGS. 7 and 8, a first tapered section 201 having a narrow width is formed substantially at the longitudinal center in the forward region of the upper surface of the stop-position regulating member 200. Second tapered sections 202 are formed along both lateral sides of the upper surface of the stop-position regulating member 200 in a rearward direction with respect to the first tapered section 201. The cone angle of the first tapered section 201 is set to $\theta_1$ which is equal to the inclination angle of the first guide groove 151, and the cone angle of the second tapered section 202 is set to $\theta_2$ which is equal to the inclination angle of the second guide groove 152. In front of each of the second tapered sections 202 formed on the upper surface of the stop-position regulating member 200, a first face 203 for regulating the stop position of the movable shell (hereinafter simply referred to as a first stop-position regulating face, and the same shall apply to the corresponding elements throughout the specification), a second face 204 for regulating the stop position of the movable shell, and a third face 205 for regulating the stop position of the movable shell are formed in that order from the front edge of the upper surface of the stop-position regulating member 200. Specifically, they are formed so as to be spaced at constant pitches apart from each other in the lateral direction of the stop-position regulating member 200 as well as to be aligned to each other along an imaginary line at the same inclination angle as the cone angle $\theta_1$ of the first tapered section 201.

Columnar elements 206 downward project at right angles from the lower surface of the stop-position regulating member 200 so as to correspond to the holes 132 opened in the mount 130 of the upper case 102. Claws 207 downward project at right angles from the edge of the lower surface of the stop-position regulating member 200 so as to correspond to the holes 133 opened in the mount 130.

The stop-position regulating member 200 is attached to the upper case 102 in the following manner. To begin with the return springs 300 are housed in the columnar elements 206 respectively. As shown in FIG. 9, the columnar elements 206 which house the return springs 300 are inserted into the holes 132 opened in the upper case 102. Similarly, the claws 207 are inserted into the holes 133 opened in the upper case 102, so that they engage with the rear surface of the upper case 102. As a result, the stop-position regulating member 200 is constantly biased in the upward direction and is stably retained by means of the elastic spring force of the return springs 300. The stop-position regulating member 200 can be made to elastically move in the vertical direction within the extent between where the claws 207 engage with the rear surface of the upper case 102 and where the rear surface of the stop-position regulating member 200 comes into contact with the stop surface 131 formed on the upper case 102.

<Configuration of Disengaging Button 400>

Figure 10:
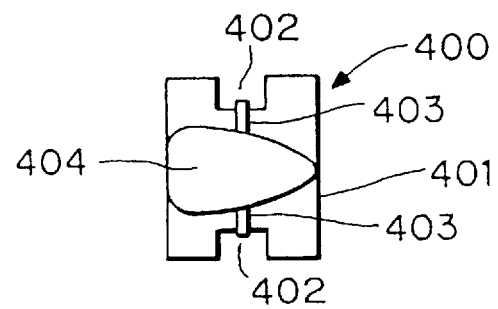
FIG. 10 is a plan view of a disengaging button.
Figure 11:
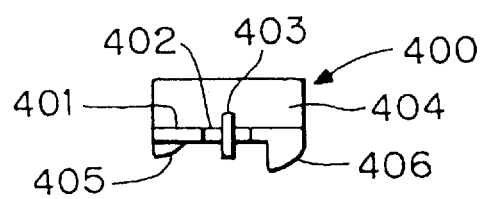
FIG. 11 is a side view of the disengaging button.
Figure 12:
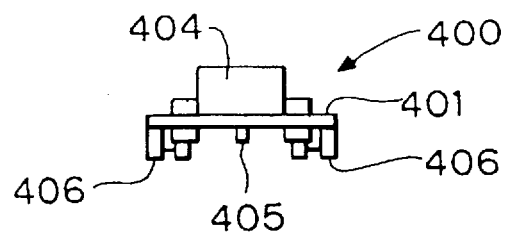
FIG. 12 is a front view of the disengaging button.

The configuration of the disengaging button 400 will now be described with reference to FIGS. 10 to 12. FIG. 10 is a plan view of the disengaging button 400, FIG. 11 is a side view of the disengaging button 400, and FIG. 12 is front view of the disengaging button 400.

As shown in the drawings, the disengaging button 400 comprises a rectangular substrate 401, angular notches 402 formed in both shorter sides of the substrate 401 so as to be opposite to each other, ribs 403 raised as if to extend between the centers of the angular notches 402 in the longitudinal direction of the disengaging button 400, a teardrop-shaped actuating section 404 formed on the upper surface of the substrate 401, a first contact 405 raised at the front end lateral center of the lower surface of the substrate 401, and second contacts 406 raised from a rearward portion of the lower surface along both sides of the substrate 401. The first contact 405 comes into contact with the first tapered section 201 formed on top of the stop-position regulating member 200. The second contacts 406 come into contact with the second tapered sections 202 formed on the upper surface of the stop-position regulating member 200. Those first and second contacts 405 and 406 are formed to sizes and shapes which permit the leading ends of the contacts 405 and 406 to constantly come into slight contact with the first and second tapered sections 201 and 202 irrespective of the position of the movable shell 500 in relation to the mouse main body 100.

The attachment of the disengaging button 400 to the movable shell 500 will be explained in the following descriptions of the movable shell 500.

<Configuration of Movable Shell 500>

Figure 13:
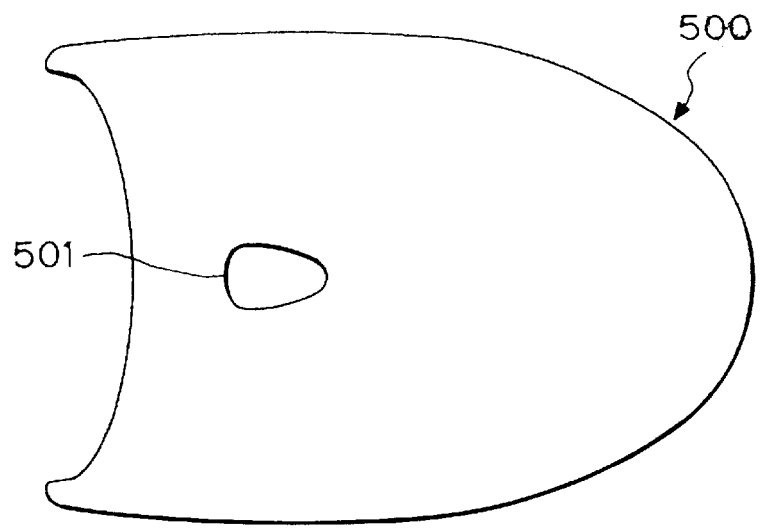
FIG. 13 is a plan view of a movable shell.

The configuration of the movable shell 500 will be described with reference to FIGS. 13 to 15. FIG. 13 is a plan view of the movable shell 500, FIG. 14 is an inside view of the movable shell 500, and FIG. 15 is a cross-sectional view of the movable shell 500.

As illustrated in these drawings, the movable shell 500 is small enough to fit the palm of the hand and has a smooth curve. The front edge of the movable shell 500 is inwardly curved so as to allow the switch actuating sections 136, 137 and 138 disposed in the mouse main body 100 to be exposed. A teardrop-shaped hole 501 into which the actuating section 404 of the disengaging button 400 is inserted is opened in the center close to the front edge of the movable shell 500. As shown in FIGS. 14 and 15, a pair of projections 502 project, parallel to each other, from each side of the teardrop-shaped hole 501 such that the rib 403 of the disengaging button 400 is retained between the pair of projections 502. A protuberance 503 for regulating a stop position (hereinafter simply referred to as stop-position regulating projections) projects from the interior surface on each side of the teardrop-shaped hole 510 side by side with the pair of projections 502. The stop-position regulating protuberances 503 selectively engage with the stop-position regulating faces 203, 204 and 205 formed in the stop-position regulating member 200. A rib 504 projects from the interior surface of the movable shell 500 so as to be rearwardly spaced at a predetermined interval L from the stop-position regulating protuberances 503. The rib 504 retains the stop-position regulating member 200 in cooperation with the stop-position regulating protuberances 503. The interval L between the stop-position regulating protuberances 503 and the rib 504 is set so as to be slightly larger than the width S of the stop-position regulating member 200 (FIG. 7).

Two first guide protuberances 505 project from the interior surface of the movable shell 500 so as to be symmetrical about the longitudinal center of the movable shell as well as to be close to the front edge with respect to the stop-position regulating protuberances 503. The first guide protuberances 505 engage with the first guide grooves 151 made in the side surfaces of the upper case 102. A second guide protuberance 506 projects from a rearward position on the interior surface of the movable shell 500 with respect to the rib 504, so as to engage with the second guide groove 152 formed in the upper case 102. A rib 507 is provided behind the second guide protuberance 506. This rib 507 passes through the prevention element 600, whose details will be described later, when the movable shell 500 moves in the rearward direction with respect to the mouse main body 100, which makes it impossible for the prevention element 600 to become dislodged.

Figure 14:
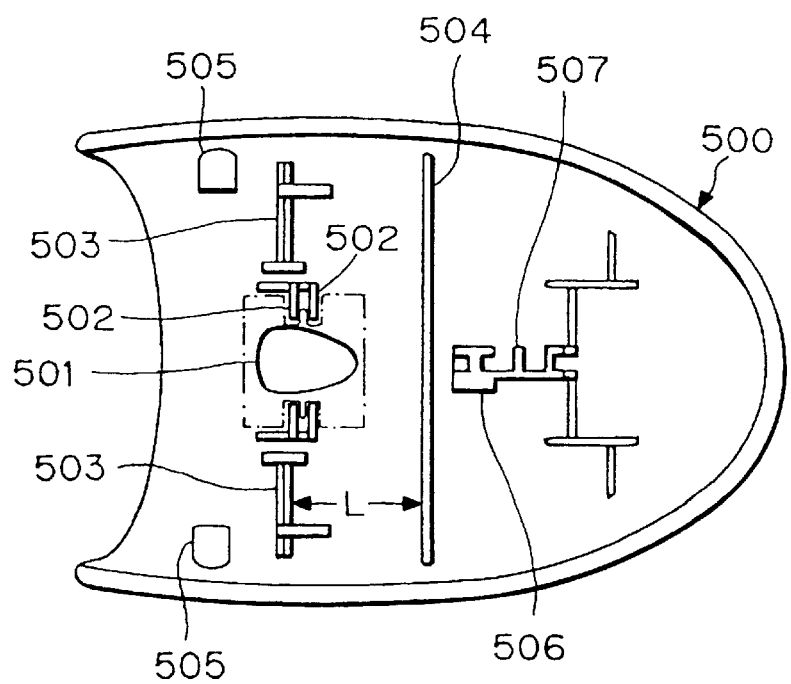
FIG. 14 is a schematic internal representation of the movable shell.
Figure 15:
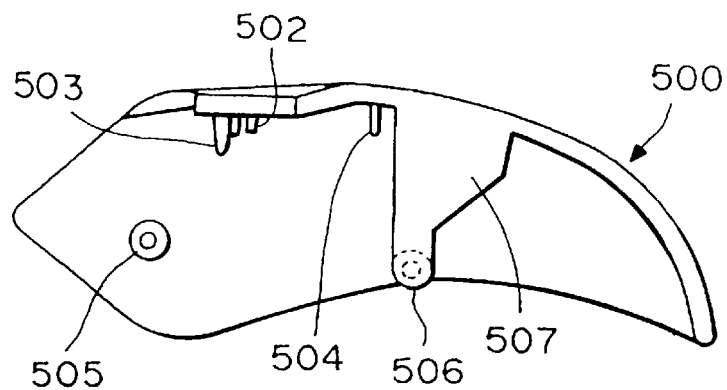
FIG. 15 is a cross-sectional view of the movable shell.
Figure 16:
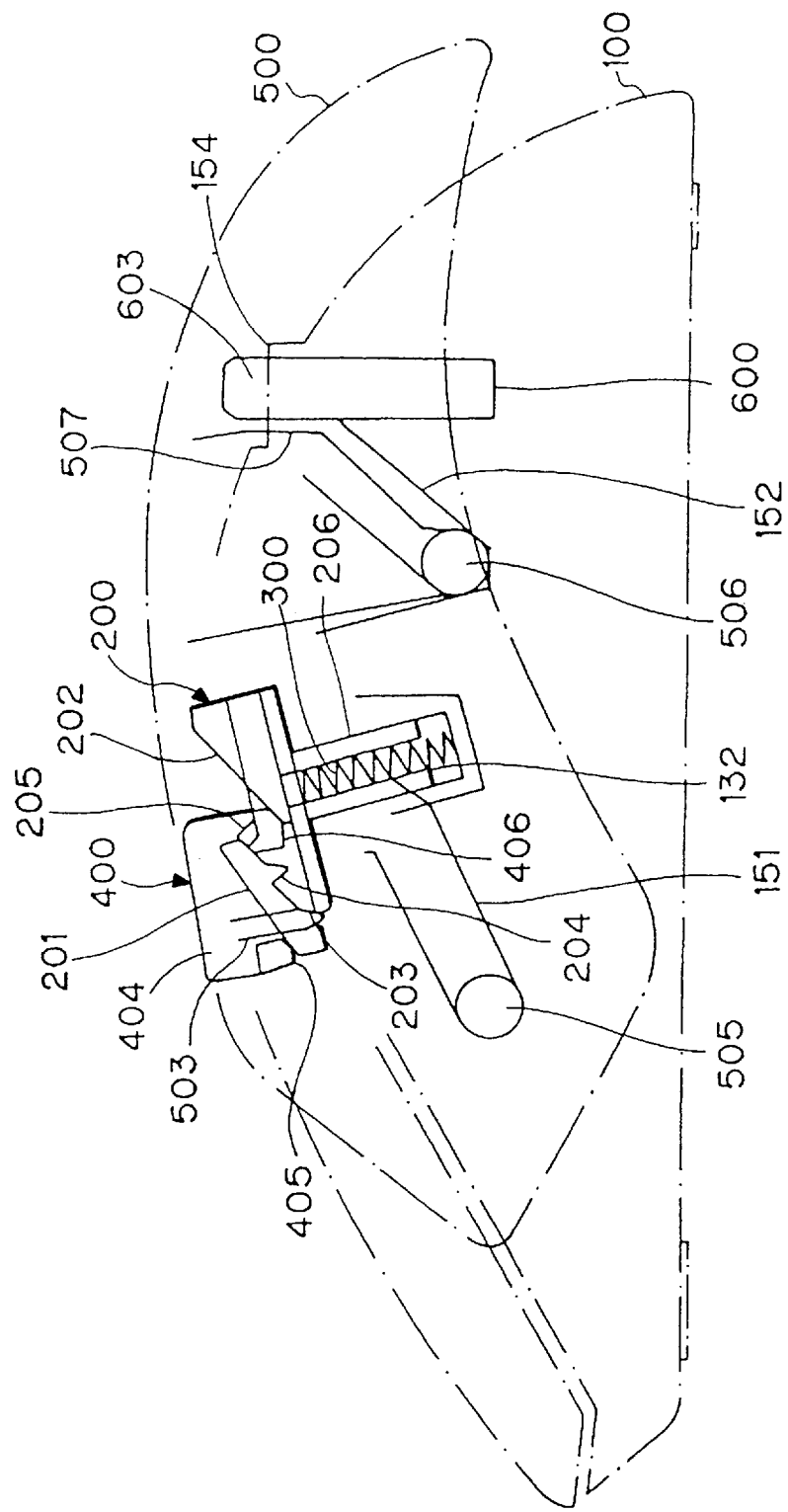
FIG. 16 is an illustration of the movable shell when it has moved to the forefront position.

As shown in FIG. 14, the disengaging button 400 is attached to the interior surface of the movable shell 500 by inserting the teardrop-shaped actuating section 404 into the hole 501 as well as fitting the ribs 403 between the respective pairs of protuberances 502. On the other hand, the movable shell 500 is attached to the mouse main body 100 through the following steps, as shown in FIG. 16. Specifically, the first guide protuberances 505 and the second guide protuberance 506 are inserted into the first guide grooves 151 and the second guide groove 152 formed in the upper case 102, respectively. Then, the stop-position regulating protuberances 503 are selectively engaged with any one of the three stop-position regulating faces 203, 204 and 205 formed in the stop-position regulating member 200. Further, the first contact 405 and the second contacts 406 projecting from the lower surface of the disengaging button 400 are brought into contact with the first and second tapered sections 201 and 202 formed on the upper surface of the stop-position regulating element 200.

<Configuration of Prevention Element 600>

As shown in FIG. 1, the prevention element 600 is substantially C-shaped and is made up of two resilient pieces 602 connected together by a coupling portion 601. A detent 603 outwardly projects from the side surface of the front end of each resilient piece 602. The two resilient pieces 602 are spaced apart from each other at such an interval as to enable the rib 507 projecting from the interior surface of the movable shell 500 to pass as well as to prevent the removal of the detents 603 from the upper case 102 while the rib 507 is inserted between the resilient pieces 602.

<Operation of Movable Shell 500>

Figure 17:
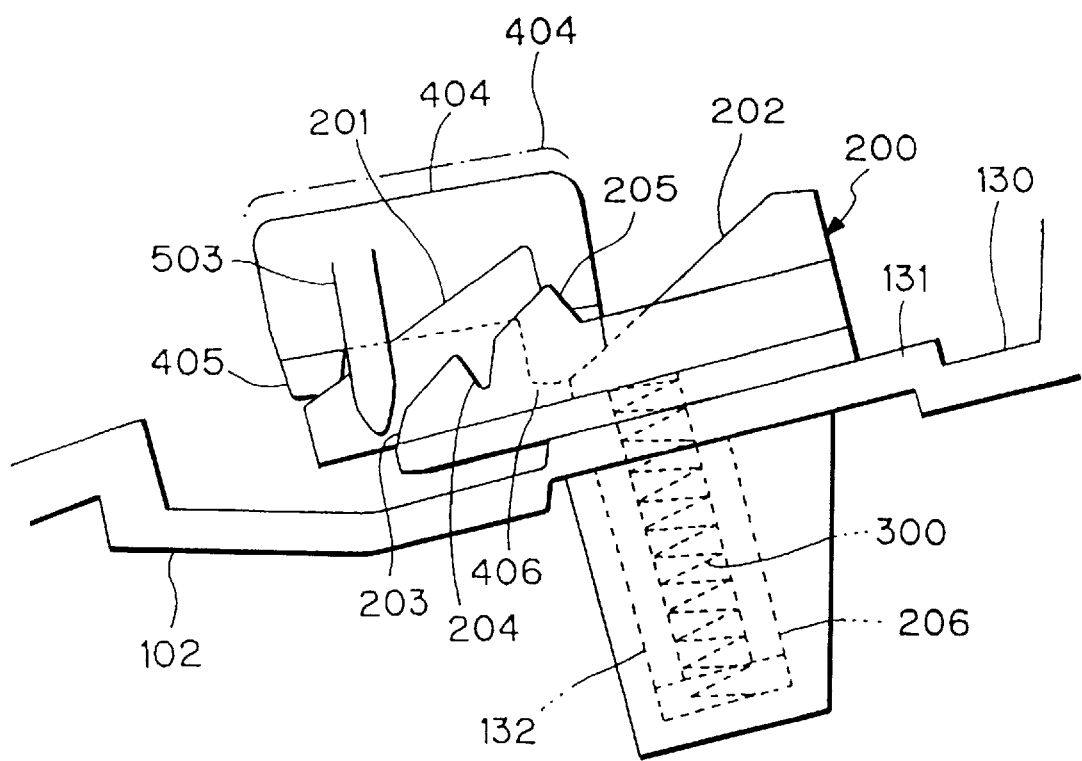
FIG. 17 is an illustration for describing a method of disengaging the stop-position regulating element from a stop-position regulating projection.
Figure 18:
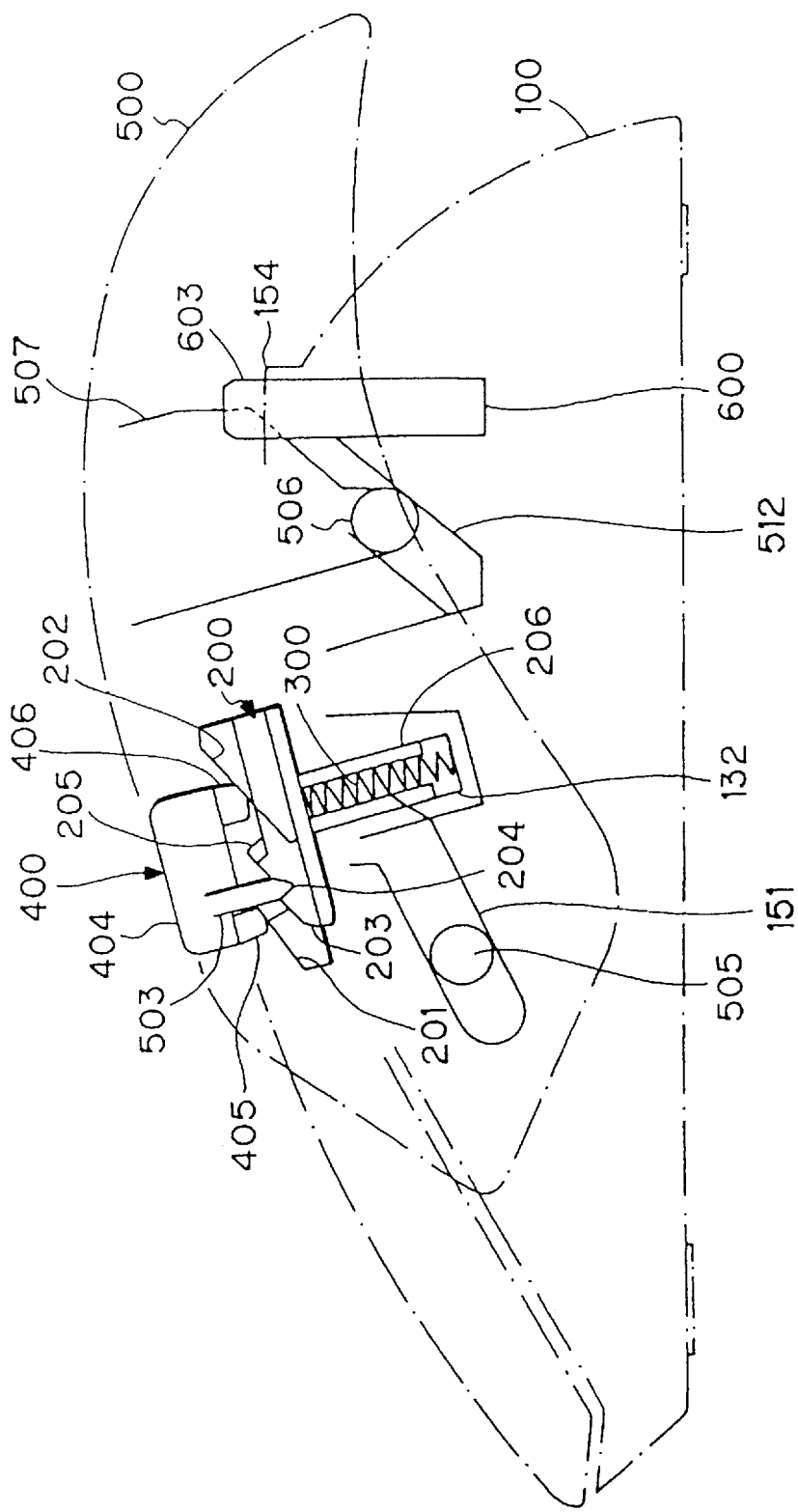
FIG. 18 is an illustration showing the movable shell when it has moved to the middle position.
Figure 19:
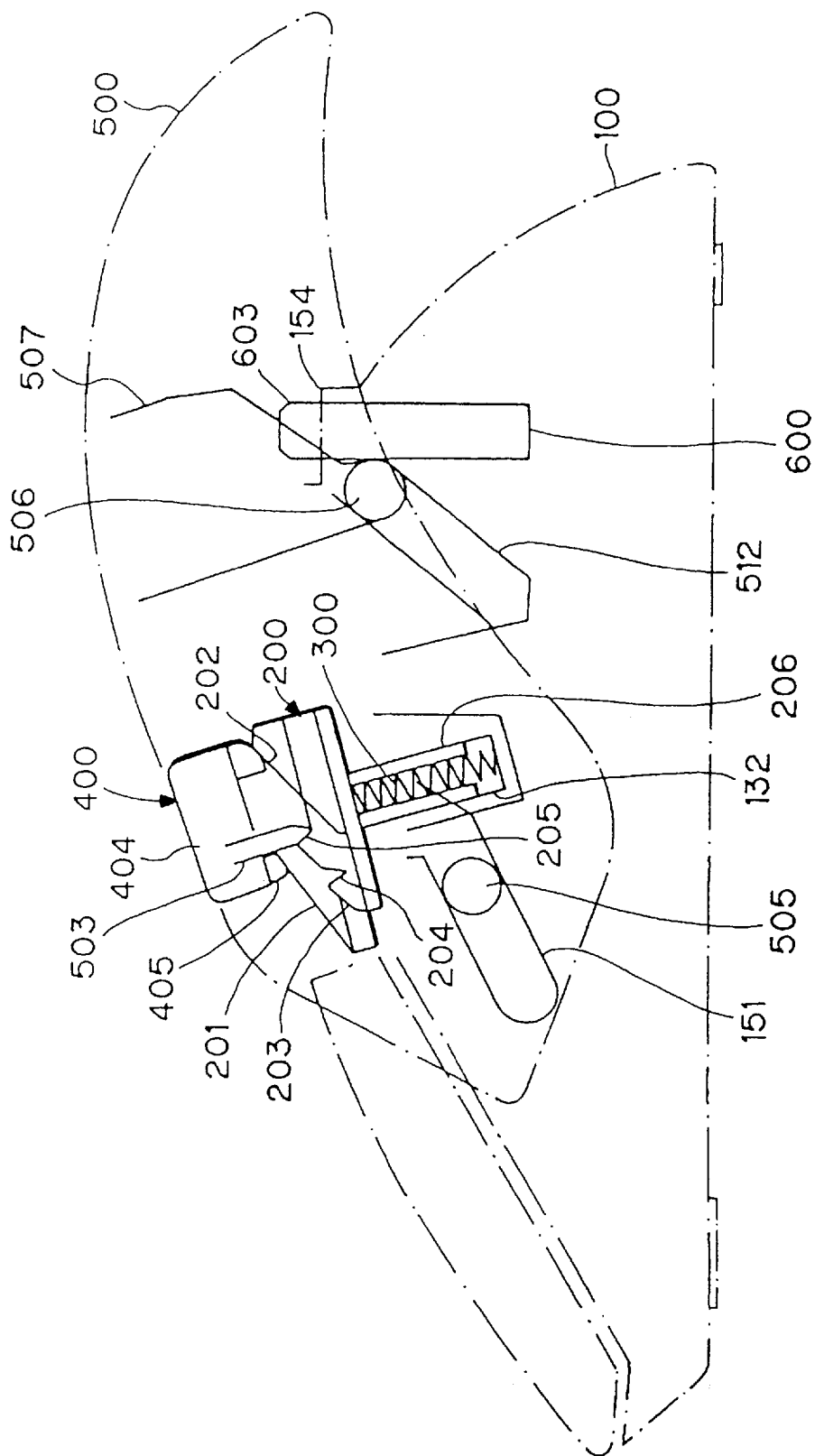
FIG. 19 is an illustration showing the movable shell when it has moved to the rearmost position.
Figure 20:
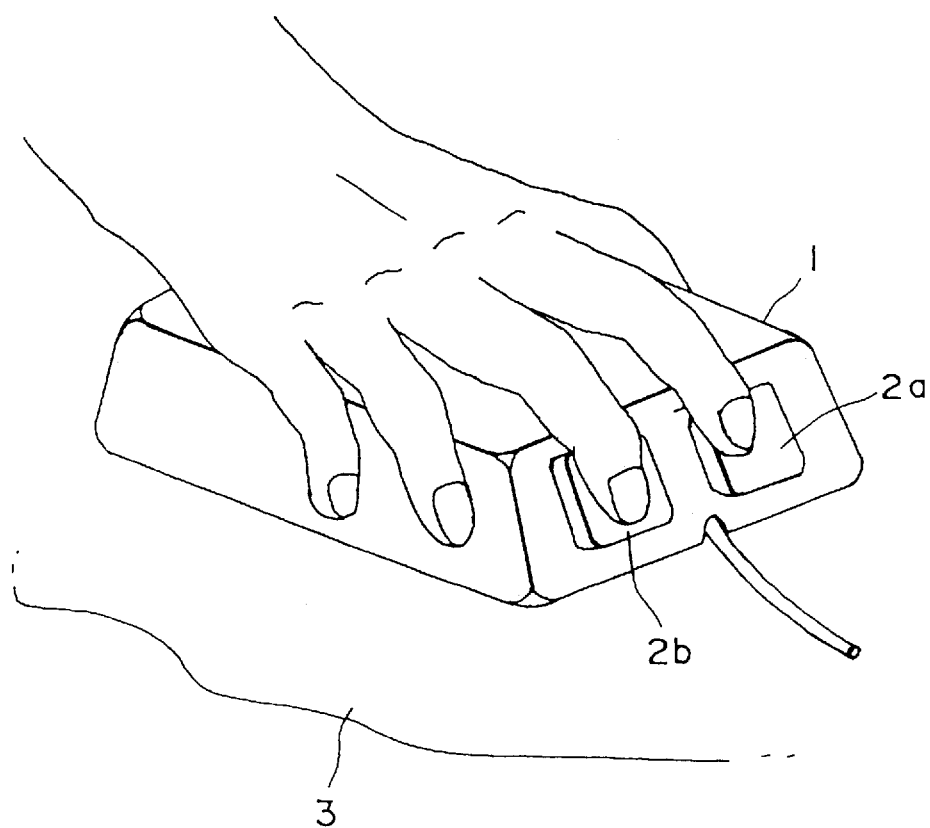
FIG. 20 is a perspective view showing a conventionally known X-Y coordinate input device when it is in use.

With reference to FIGS. 16 to 19, the operation of the movable shell 500 will be described. FIG. 16 is a schematic representation showing the movable shell 500 which has been moved to the forefront of the mouse main body, FIG. 17 is a schematic representation showing the disengagement of the stop-position regulating member 200 from the stop-position regulating protuberances 503, FIG. 18 is the movable shell 500 which has been moved to the intermediate position of the mouse main body, and FIG. 19 is the movable shell 500 which has been moved to the rearmost position of the mouse main body.

In the state in which the movable shell 500 has been moved to the forefront of the mouse main body 100, the first guide protuberances 505 are positioned at the front ends of the first guide grooves 151 formed in the upper case 102, as shown in FIG. 16. The second guide protuberance 506 is positioned at the lowermost end of the second guide groove 152 formed in the upper case 102. As a result, the movable shell 500 is positioned in the lowest position with respect to the mouse main body 100. At this time, the stop-position regulating protuberances 503 raised from the interior surface of the movable shell 500 are brought into contact with the first stop-position regulating faces 203, formed at the foremost position, among the three stop-position regulating faces 203, 204 and 205 formed in the stop-position regulating member 200, as shown in FIG. 16.

In the above described state, the first guide protuberances 505 are brought into contact with the foremost ends of the first guide grooves 151, while the second guide protuberance 506 is brought into contact with the lowermost end of the second guide groove 152. The stop-position regulating protuberances 503 are in contact with the first stop-position regulating faces 203. As a result, it becomes impossible for the movable shell 500 to longitudinally and vertically move with respect to the mouse main body 100, whereby the movable shell 500 is stably retained by the mouse main body 100.

Further, in the previously described state, the rib 507 projecting from the interior surface of the movable shell 500 is not inserted into the interval between the two resilient pieces 602 which form the prevention element 600. Therefore, it is possible to insert or remove the prevention element 600 into or from the upper case 102. As a result of the movable shell 500 being positioned in the forefront of the mouse main body 100, it becomes possible to assemble the mouse main body 100 and the movable shell 500 into a device.

Subsequently, if the disengaging button 400 is pressed downwards, as shown in FIG. 17, the stop-position regulating member 200 is lowered against the elastic spring force of the return springs 300. As a result, the stop-position regulating protuberances 503 are disengaged from the first stop-position regulating faces 203, so that the movable shell 500 becomes possible to move rearwardly.

If the movable shell 500 is moved rearwardly, and if the disengaging button 400 is released when the stop-position regulating protuberances 503 have arrived at the second stop-position regulating faces 204, the stop-position regulating member 200 is raised again by means of the elastic spring force of the return springs 300. As a result, the stop-position regulating protuberances 503 are engaged with the second stop-position regulating faces 204. Further, the first and second protuberances 405 and 406 formed on the lower surface of the disengaging button 400 again come into contact with the first and second tapered sections 201 and 202 formed on the upper surface of the stop-position regulating member 200. As a result of this, it becomes possible to actuate the disengaging button 400 again.

The first and second guide protuberances 505 and 506 move to the middle of the first and second guide grooves 151 and 152, as shown in FIG. 18. Then, the movable shell 500 moves upward in the rearward direction with respect to the mouse main body 100. The inclination angle $\theta_2$ of the second guide groove 152 is set to be greater than the inclination angle $\theta_1$ of the first guide groove 151. For this reason, the rear end of the movable shell 500 is raised to a higher position than that to which its front end is raised by only a difference between the inclination angles of the guide grooves.

In the above described state, the stop-position regulating protuberances 503 are engaged with the V-shaped second stop-position regulating faces 204. Eventually, it becomes also impossible for the movable shell 500 to longitudinally and vertically move with respect to the mouse main body 100, so that the movable shell 500 is stably retained by the mouse main body 100. At this time, the rib 507 projecting from the interior surface of the movable shell 500 is inserted into the interval between the two resilient pieces 602 of the prevention element 600, as shown in FIG. 18. The prevention element 600 becomes impossible to be removed from the upper case 102, which in turn makes it impossible to intentionally or erroneously disassemble the X-Y coordinate input device into the mouse main body 100 and the movable shell 500.

In the above described state, if the disengaging button 400 is pressed downward again, and if the movable shell 500 is moved rearwardly, the first and second guide protuberances 505 and 506 move to the rearmost ends of the first and second guide grooves 151 and 152, as shown in FIG. 19. As a result, the stop-position regulating protuberances 503 can engage with the third stop-position regulating faces 205, formed in the rearmost position, among the three stop-position regulating faces 203, 204 and 205 formed in the stop-position regulating member 200. The movable shell 500 has eventually moved to the rearmost, highest position.

Even in the case of the above described state, the first guide protuberances 505 engage with the first guide grooves 151, and the second guide protuberance 506 engages with the second guide groove 152. Further, the stop-position regulating protuberances 503 comes into contact with the third stop-position regulating faces 205. As a result, it becomes impossible for the movable shell 500 to longitudinally and vertically move with respect to the mouse main body 100. The movable shell 500 is stably retained by the mouse main body 100. Even if attempts were made to press the disengaging button 400 downward and to move the movable shell 500 to a further rearward position in that state, the second guide protuberance 506 will butt against the prevention element 600. Therefore, the movement of the movable shell 500 and the removal of the movable shell 500 from the mouse main body 100 will be prevented.

For the X-Y coordinate input device of the present embodiment, the movable shell 500 is attached to the mouse main body 100 so as to be longitudinally movable, and hence the distance between the switch actuating sections 136, 137 and 138 disposed on the mouse main body 100 and the area of the movable shell 500 with which the palm of the hand comes into contact can be changed depending on the extent of the longitudinal movement of the movable shell. It is possible to make the size of the X-Y coordinate input device suit the preferences of the user which may change depending on the size and thickness of hands, the lengths of fingers, and the posture of the user when operating the X-Y coordinate input device. It is not only to longitudinally move the movable shell 500 with respect to the mouse main body 100 but also to move it in the longitudinal and vertical directions in combination. Further, the vertical movements of the rear end of the movable shell 500 are set so as to become greater than those of the front end of the same. Consequently, the positional relationship between the switch actuating sections 136, 137 and 138 and fingertips which varies as a result of the longitudinal movements of the movable shell 500, can be corrected by the vertical movements of the movable shell 500. The positional relationship between the switch actuating sections 136, 137 and 138 and the fingertips can be constantly maintained in the optimum state. Accordingly, it becomes possible to provide an X-Y coordinate input device which provides superior operability and an excellent feeling of use of the switch actuating sections and prevents a user from experiencing fatigue even if the user uses the X-Y coordinate input device for a long period of time.

The position of the movable shell 500 can be changed in three stages, and hence the X-Y coordinate input device can suit many users.

The position of the movable shell 500 can be longitudinally changed with respect to the mouse main body 100 by only biasing the movable shell 500 in the longitudinal direction while the disengaging button 400 is being pressed. Hence, the position of the movable shell 500 can be very simply changed, which renders the convenience and use of the X-Y coordinate input device superior.

The prevention element 600 is designed so as not to be removed from the outside, which prevents the erroneous disassembly of the movable shell 500. As a result, the reliability of the X-Y coordinate input device of the present embodiment becomes superior.

The feature of the present invention resides in the fact that the movable shell is attached to the mouse main body so as to be longitudinally movable. In other respects, the present invention is not limited to the previously described embodiment, and, as a matter of course, the construction of the embodiment can be modified as required. Other embodiments of the present invention will be described hereinbelow.

(1) In the previous embodiment, the movable shell 500 is not only movable with respect to the mouse main body 100 but also is movable in the longitudinal and vertical directions in combination. Further, the rear end of the movable shell 500 vertically moves over a greater extent than that over which the front end thereof vertically moves. However, it is also possible to move the movable shell 500 only in the longitudinal direction with respect to the mouse main body 100. An X-Y coordinate input device of the present embodiment can be implemented by forming the first and second guide grooves 151 and 152 parallel to the lower case 101. Moreover, the front end and rear end of the movable shell 500 can be made substantially equal to each other with regard to the extent of the vertical movements. The X-Y coordinate input device of the present embodiment can be implemented by forming the first and second guide grooves 151 and 152 parallel to each other.

(2) Although the movable shell 500 can be changed in three stages with respect to the mouse main body 100 in the previous embodiment, it may be changed in two stages or more than three stages. An X-Y coordinate input device of this embodiment can be implemented by changing the number of the stop-position regulating faces to be formed in the stop-position regulating member 200.

(3) In the previous embodiment, the guide grooves 151 and 152 are formed in the upper case 102 of the mouse main body 100, and the guide protuberances 505 and 506 which mesh with the guide grooves are formed on the interior surface of the movable shell 500. Contrary to this, the guide grooves may be formed in the interior surface of the movable shell 500, and the guide protuberances may be formed on the upper case 102 if design permits.

(4) It goes without saying that the number of switches and those of switch actuating sections corresponding to the switches can be changed as necessary.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. An X-Y coordinate input device including a mouse main body and a movable shell which is attached on top of the mouse main body so as to be changeable to another position with respect to the mouse main body, the improvement being characterized by that the moveable shell is attached to the mouse main body so as to be movable in stages in a longitudinal direction thereof, and an interval between a switch actuating section disposed in the mouse main body and the area of the movable shell with which the palm of the hand comes into contact is made changeable, and a stop-position regulating element is provided, said stop position regulating element being biasedly coupled to the mouse main body for releasably engaging with the movable shell at a position where the movable shell is moved, wherein the element for regulating a stop position is provided with a plurality of faces for regulating a stop position which are spaced at given intervals away from, in parallel to, each other in the longitudinal direction of the mouse main body, and wherein projections for regulating a stop position project from the interior surface of the movable shell so as to be engagable with the respective faces for regulating a stop position, and as a result of selective engagement between the projection for regulating a stop position and any one of the faces for regulating a stop position, the position of the movable shell is set in stages with respect to the mouse main body.

2. An X-Y coordinate input device as defined in claim 1, wherein the movable shell is attached to the mouse main body so as to be movable in both longitudinal and vertical directions thereof, and the movable shell moves upwards with respect to the lower surface of the mouse main body as it moves from a forward position of the mouse main body in a rearward direction thereof.

3. An X-Y coordinate input device as defined in claim 1, wherein a rear portion of the movable shell vertically moves to a higher position than that to which a front portion of the same vertically moves.

4. An X-Y coordinate input device as defined in claim 1, wherein guide grooves are made in either the mouse main body or the movable shell, and protuberances which are engageable with the guide grooves are formed in the other member, whereby as a result of the movement of the protuberances along the guide grooves, the movable shell moves in a desired direction with respect to the mouse main body.

5. An X-Y coordinate input device as defined in claim 1, wherein the stop-position regulating element is attached to the top of the mouse main body so as to be vertically movable via return springs, and the movable shell is provided with a disengaging button which can be operated from the outside of the movable shell and is constantly contact with the stop-position regulating element, and wherein, as a result of pressing the disengaging button, the element for regulating a stop position is lowered against an elastic spring force of the return springs, so that the faces for regulating a stop position are disengaged from the stop-position regulating projections, which makes it possible to change the preset position of the movable shell with respect to the mouse main body.

6. An X-Y coordinate input device as defined in claim 1, wherein the mouse main body is provided with an element for preventing the movable shell from becoming dislodged from the mouse main body.

7. An X-Y coordinate input device as defined in claim 1, wherein the element for preventing the movable shell from becoming dislodged from the mouse main body is only attached to, or removed from, the inside of the mouse main body.

8. The X-Y coordinate input device of claim 1, wherein said movable shell comprises stop-position regulating protuberances.

9. The X-Y coordinate input device of claim 1, wherein said stop-position regulating element comprises a plurality of faces, such that said faces releasably engage to said stop-position regulating protuberances.

10. The X-Y coordinate input device of claim 1, wherein said stop-position regulating element additionally comprises claws, such that said claws are slidably secured to said mouse main body.

11. The X-Y coordinate input device of claim 1, wherein said stop position regulating element additionally comprises tapered sections.

12. The X-Y coordinate input device of claim 1, additionally comprising a disengaging button disposed on said stop-position regulating element for allowing a user to biasedly operate said stop-position regulating element.

13. The X-Y coordinate input device of claim 12, wherein said disengaging button comprises a plurality of contacts, such that said contacts communicated with said tapered sections.

14. The X-Y coordinate input device of claim 12, wherein said disengaging button additionally comprises an actuating section.

15. The X-Y coordinate device of claim 1, wherein said movable shell additionally comprises a hole such that said actuating section penetrates therethrough.

16. The X-Y coordinate input device of claim 1, additionally comprising a prevention element disposed in said mouse main body for preventing said moveable shell from dislodging from said mouse main body.

* * * * *